April 3, 1934.  G. W. JOSTEN  1,953,716
APPARATUS FOR AUTOMATICALLY RECORDING VOLUMETRIC
AND TEMPERATURE DISTILLATION DATA
Filed March 7, 1932  3 Sheets-Sheet 3

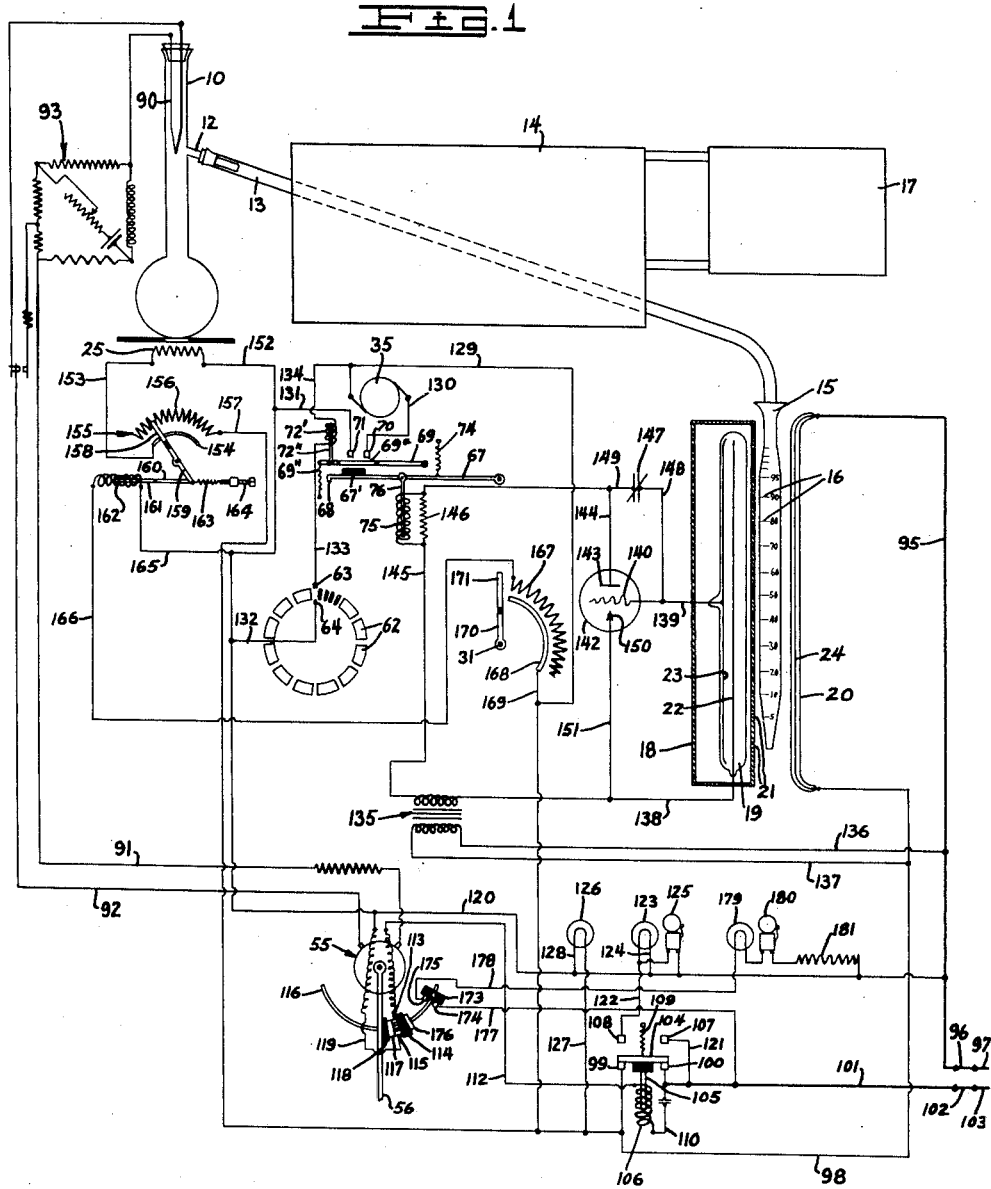

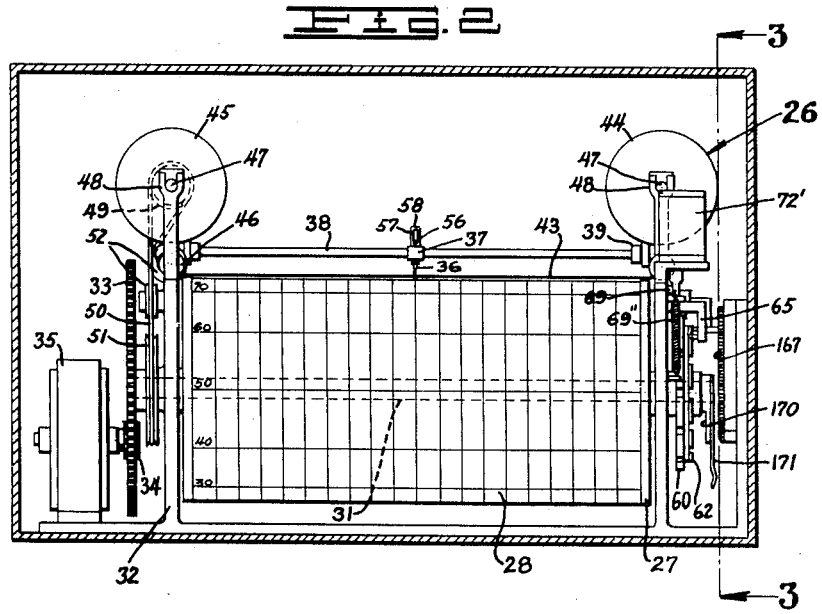
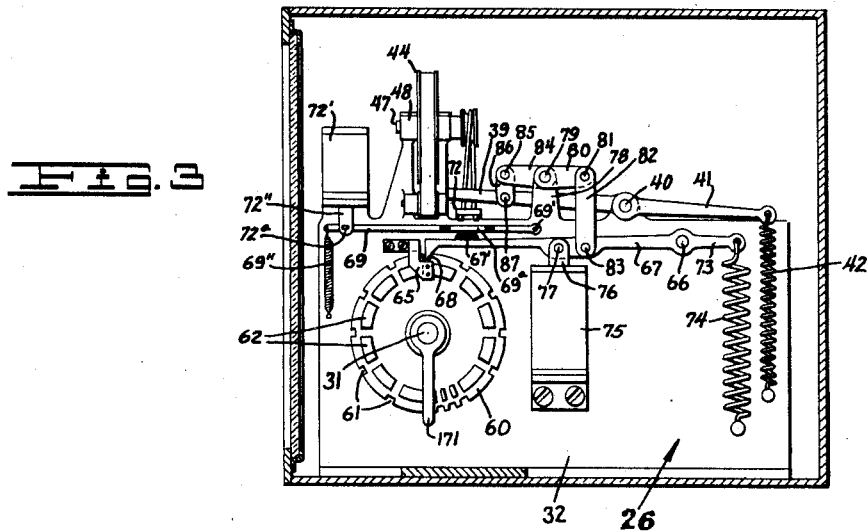

INVENTOR.
GEORGE W. JOSTEN.
BY B. J. Craig
ATTORNEY.

Patented Apr. 3, 1934

1,953,716

UNITED STATES PATENT OFFICE 1,953,716

APPARATUS FOR AUTOMATICALLY RECORDING VOLUMETRIC AND TEMPERATURE DISTILLATION DATA

George W. Josten, Pasadena, Calif.

Application March 7, 1932, Serial No. 597,279

6 Claims. (Cl. 234—6)

This invention relates to apparatus for automatically recording volumetric and temperature distillation data.

The general object of the invention is to provide a novel apparatus for recording the vapor temperature of fluid which is distilled.

Another object of the invention is to provide an apparatus of the class described wherein means is provided for vaporizing and condensing fluid at various temperatures and wherein novel means is provided to record the volume of fluid distilled and to record the vapor temperature at which the relative volumes of fluid are vaporized.

Other objects of the invention will be apparent from the following description taken in connection with the accompanying drawings, wherein:

Fig. 1 is a diagrammatic layout of my improved method and apparatus for testing liquids.

Fig. 2 is a front view of my recording device with the casing in section.

Fig. 3 is a section taken on line 3—3 of Fig. 2.

Fig. 4 is a top plan view of the device shown in Fig. 1 with the casing in section.

Fig. 5 is a fragmentary section taken on line 5—5 of Fig. 4.

Fig. 6 is a face view on a reduced scale of a chart used with the recording device shown in Fig. 2, and, Fig. 7 is a diagrammatic detail.

In the practice of my invention I employ a still 10 which may be of any desired type having a vapor outlet 12 which communicates with a condenser conduit 13. The conduit 13 as shown passes through a refrigeration device 14 and is adapted to discharge into a collecting tube 15 which has a graduated scale thereon as indicated at 16. The refrigeration device 14 may be cooled as by an electrically operated refrigeration machine as indicated at 17 or by other means.

Adjacent the tube 15 I provide a housing 18 in which I arrange a photo electric device 19 and opposite the housing 18 on the other side of the tube 15 I provide a glow tube 20. The housing 18 is provided with a plurality of rectangular shaped spaced apertures 21 which correspond to the graduations on the collector tube 15.

The photoelectric cell or cells 19 may be of any desired type including an electrode 22 and a lining 23 on the glass of the cell, the lining being preferably made of potassium, and the glow tube 20 may be of any desired type including a filament 24.

The still 10 is shown as adapted to be heated by an electrical resistance unit 25.

In operation the desired amount of liquid, usually 100 cc., is placed in the still 10 and heated and as the vapors are relased from the liquid they pass into the tube 13 wherein they are condensed and then flow into the collector tube 15.

As predetermined amounts of fluid collect in the tube 15 I desire to automatically record the temperature at which the vapors are coming over in the still head corresponding to the gradations on the collector tube. For this purpose I provide a recording device indicated generally at 26 and shown in Figs. 2, 3 and 4.

As shown the recording device 26 includes a drum 27 on which a chart 28 is adapted to be positioned. The chart is provided with graduations 29 which correspond to the volume graduations 16 on the collector tube 15 and further includes graduations 30 arranged at right angles to the graduations 29 to indicate temperature.

The drum 27 is mounted on a shaft 31 which is rotatably supported in a frame 32. Secured adjacent one end of the shaft 31 I provide a gear 33 which meshes with a gear 34 secured to the armature shaft of an electric motor 35.

For marking on the chart 28 I provide a stylus 36 which is carried by a block 37 slidably mounted on a rod 38. Adjacent each end the rod 38 is supported by arms 39 which are pivotally mounted on the frame 32 as at 40 (Fig. 3). One of the arms 39 includes an extended portion 41 beyond the pivot 40 to which I secure one end of a coiled spring 42, the other end of which is suitably anchored to the frame 32. The spring 42, through the medium of the arms 39 and the bar 38, normally resiliently retains the stylus in a raised position.

In line with the rod 38 and positioned between the end of the stylus and the drum I provide an inked ribbon 43 which is shown as supported on spools 44 and 45 and retained in correct relationship to the drum by guide rollers 46.

The spools 44 and 45 include shafts 47 which are removable and rotatably supported in bearings 48 integral with the frame 32. The ribbon 43 is adapted to be unwound from the spool 44 and wound on the spool 45 and for this purpose I provide a pulley 49 on the shaft 47 of the spool 45. The pulley 49 is driven by a belt 50 from a pulley 51 secured to the shaft 31 and the belt is shown as correctly guided by idler pulleys 52.

For moving the stylus I provide a device which is indicated generally at 55 and which may be of any desired construction including a movable arm 56. The arm 56 extends through a transversely elongated aperture 57 provided in an upwardly projecting portion 58 of the stylus block 37. Thus when the arm 56 moves it moves the stylus block 37 back and forth along the rod 38.

Secured to the shaft 31 adjacent the end opposite to the gear 33 I provide a disc 60 having a plurality of peripheral notches 61 therein which correspond in number to the number of graduations 16 on the collector tube 15. Mounted on the disc 60 and insulated therefrom I provide a plurality of contact segments 62 which are spaced apart in line with the notches 61. The contact segments 62 are adapted to bridge a pair of spaced contacts 63 and 64 (Fig. 1) which are mounted on an insulated bracket 65 (Fig. 2) which is secured to the frame 32.

Pivotally mounted on the frame 32 as at 66 (Fig. 3) I provide an arm 67 which includes at one end a downwardly extending finger 68 which is adapted to fit in the notches 61 of the disc 60. Mounted on the arm 67 I provide an insulated member 67' which is adapted to engage an arm 69. One end of the arm 69 is pivoted to the frame 32 as at 69' and the opposite end has secured thereto a coiled spring 69'' which resiliently urges the arm 69 downward.

Intermediate the length of the arm 69 I provide a contact bar 69ª which is insulated from the arm 69 and is adapted in one position to bridge a pair of contacts 70 and 71 which are mounted on an insulated bracket 72 secured to the frame 32.

For moving the arm 69 upward I provide an electro-magnet such as a solenoid 72' which includes a core 72''. The core 72'' is pivotally connected as at 72ª to the arm 69 adjacent the spring 69''.

Extending beyond the pivot 66 the arm 67 includes a portion 73 to which one end of a coiled spring 74 is connected, the opposite end of which is suitably anchored to the frame 32. The spring 74 resiliently urges the end of the arm 67 including the finger portion 68 upwardly out of engagement with the disc 60.

For moving the finger portion 68 into engagement with the disc 60 I provide an electro-magnet such as a solenoid 75 which includes a core member 76. The core 76 is pivotally connected as at 77 to the arm 67 intermediate the pivot 66 and the finger 68.

Pivotally mounted on an extending portion 78 of the frame 32 I provide a shaft 79. Secured to the shaft 79 adjacent one side of the portion 78 I provide an arm 80 having pivotally connected thereto as at 81, one end of a link 82, the opposite end of which is pivotally connected as at 83 to the arm 67. Secured to the shaft 79 on the opposite side of the bearing I provide an arm 84 having pivotally connected thereto as at 85, one end of a link 86, the opposite end of which is pivotally connected as at 87 to one of the arms 39.

Thus it will be apparent that when the arm 67 moves upward the arm 39 will be moved downward through the medium of the link 82, arm 80, shaft 79, arm 84 and link 86.

As shown in Fig. 1 the device 55 is adapted to be actuated by the variation of electric energy generated in any desired type of thermocouple circuit. The coupling member 90 of the thermocouple circuit extends into the neck of the still 10 so that the junction end is slightly below the top of the outlet 12 and is connected by wires 91 and 92 to the device 55. In the accompanying drawings I have shown an automatic electric cold junction compensator circuit interposed in the wires 91 and 92 between the device 55 and the coupler 90 as indicated at 93. This type of compensator circuit is well-known and in wide use in the art. It will be understood however that any type of cold junction compensation may be used or cold junction supplied in the condenser.

As shown in Fig. 1 one end of the filament 24 of the glow tube 20 is connected by a wire 95 to a switch 96 which controls the flow of current from main line negative wire 97. The opposite end of the filament 24 is connected by a wire 98 to a contact 99 which has a companion contact 100 which is connected by a wire 101 to a switch 102 which controls the flow of current from a main line positive wire 103. The contacts 99 and 100 are adapted to be bridged by a contact bar 104 which is mounted on, and insulated from the core 105 of an electro-magnet 106. Spaced from the set of contacts 99 and 100 I provide another set of contacts 107 and 108 and for normally resiliently urging the contact bar 104 into engagement with the contacts 107 and 108 I provide a coiled spring 109.

One end of the winding of the electro-magnet 106 is connected by a wire 110 having a condenser interposed therein to the positive wire 101. The opposite end of the winding of the electro-magnet 106 is connected by a wire 112 to a contact 113 which is mounted on an insulated block 114 on which a companion contact 115 is also mounted. The block 114 is slidably mounted on an arcuate rod 116, the center of the arc of which corresponds to the pivotal axis of the arm 56 (see Figs. 1 and 4). The contacts 113 and 115 are adapted to be bridged by a contact bar 117 which is mounted on an insulated block 118 secured to the arm 56. The contact 115 is connected by a wire 119 to a wire 120 which in turn is connected to the negative wire 95.

From the foregoing it will be apparent that when the switches 96 and 102 are closed and the contact bar 117 bridges the contacts 113 and 115 the winding of the electro-magnet 106 will be energized and attract the core 105 thereof towards it and move the core against the action of the spring 109 thereby moving the contact bar 104 out of engagement with the contacts 107 and 108 and into engagement with the contacts 99 and 100, whereupon the filament 24 of the glow tube 20 will be energized.

The contact 107 is connected by a wire 121 to the positive wire 101 and the contact 108 is connected by a wire 122 to one side of an electric light globe 123 which I prefer to have green in color. The other side of the globe 123 is connected by a wire 124 to the wire 120. In parallel with the light 123 I provide an audible signal such as a buzzer or bell 125. I also provide a light globe 126 which is white in color and one side of which is connected by a wire 127 to the wire 98 and the other side of which is connected by a wire 128 to the wire 120. From the foregoing it will be apparent that when the electro-magnet 106 is energized as previously described the white light 126 will be lighted and when the electro-magnet 106 is not energized and the contacts 107 and 108 are bridged by the contact bar 104 the green light 123 will be lighted and the buzzer 125 operated.

One side of the motor 35 is connected by wires 129 and 169 to the wire 98 and the opposite side of the motor is connected by a wire 130 to the contact 70. The companion contact 71 is connected by a wire 131 to the wire 152. The contact 64 is connected by a wire 132 to the wire 120 and its companion 63 is connected by a wire 133 to one end of the solenoid winding 72' and the opposite end of the solenoid winding 72' is connected by a wire 134 to the wire 129. Thus it will be apparent that when the circuit is closed to render the contacts 70 and 71 operative and the contacts 70 and 71 are bridged by the contact bar 69ª then the motor 35 will be actuated to rotate the drum 27 and the contact bars 62 will bridge the contacts 63 and 64 through which current will continue to flow to the solenoid 72'. This will cause the contact bar 69ª to remain in engagement with the contacts 70 and 71 and the current will continue to flow to the motor after the contact arm 67 moves out of engagement with the arm 69 and the drum will continue to rotate until the contact bar 62 bridging the contacts 63 and 64 moves out of engagement therewith whereupon the circuit to the motor will be broken.

The operation of the electro-magnet 75 is controlled by the photocell 19 and an associated wiring system to which electric current is supplied through a step up transformer 135. One side of the primary winding of the transformer is connected by a wire 136 to the negative wire 95 and the other side is connected by a wire 137 to the positive wire 98.

The positive electrode 22 of the photocell 19 is connected by a wire 138 to the positive side of the secondary winding of the transformer and the lining 23 of the photocell is connected by a wire 139 to the grid 140 of a grid glow tube 142. The plate 143 of the tube 142 is connected by a wire 144 to one end of the coil of the electro-magnet 75 and the other end of the coil of the electro-magnet 75 is connected by a wire 145 to the negative side of the secondary winding of the transformer 135. Shunted across the wires 144 and 145 I provide a resistance unit 146 and shunted across the wires 144 and 139 I provide a variable condenser 147, one side of which is connected to the wire 139 by a wire 148 and the other side of which is connected by a wire 149 to the wire 144. The positive terminal 150 of the grid glow tube 142 is connected by a wire 151 to the positive wire 138.

From the foregoing it will be apparent that when the circuit is completed to the glow tube 20 and to the transformer 135 and no opaque obstruction is interposed between the glow tube 24 and the photocell 19 a continuous flow of current will pass to the windings of the electro-magnet 75 and energize it whereupon the core 76 will retain the arm 67 in a lowered position and the contact bar 69 out of engagement with the contacts 70 and 71. When an opaque substance breaks the steady passage of light from the glow tube 20 to the photocell 19 the circuit to the electro-magnet 75 will be broken whereupon the spring 74 will raise the arm 67 and the contact bar 69 will bridge the contacts 70 and 71 thereby completing an electric circuit to the motor 35 whereupon it will operate as previously described.

One side of the still heating element 25 is connected by a wire 152 to the wire 131 and the other side is connected by a wire 153 to a contact track 154 of a switch 155. One end of the rheostat coil 156 is connected by a wire 157 to the wire 98. The contact track 154 and the rheostat coil 156 are adapted to be bridged by a contact bar 158 which is mounted on a pivoted arm 159.

The arm 159 is pivotally and loosely connected to an arm 160 which is mounted on the core 161 of an electro-magnet 162. Also connected to the arm 159 and adapted to operate in opposition to the magnet 162 I provide a coiled spring 163 which is anchored to an adjustment screw 164 for varying the tension of the spring.

One end of the coil of the electro-magnet 162 is connected by a wire 165 to the wire 152 and the other end is connected by a wire 166 to one end of the coil of a rheostat 167. Adjacent the rheostat coil 167 I provide a contact track 168 which is connected by a wire 169 to the wire 98.

The rheostat coil 167 and the contact track 168 are mounted adjacent one side of the frame 32 and the center of the arc of the curvature of the rheostat coil and track corresponds to the center of the shaft 31. Mounted on the shaft 31 I provide an arm 170 which has mounted thereon and insulated therefrom a contact bar 171 which is adapted to bridge the contact track 168 and the rheostat coil 167.

Thus it will be apparent that when the shaft 31 rotates the arm 170 will rotate with it. The length and the position of the rheostat is such that the contact bar 171 bridges the contact track 168 and the rheostat coil 167 only towards the end of its travel around.

When the circuit is completed to the rheostat 155 current will flow from the coil 156 through the contact bar 158 to the contact track 154 and thence to the heating element 25. The amount of current normally passing from the rheostat 155 to the heating element 25 may be regulated by adjusting the screw 164 to vary the tension of the coiled spring 163.

As the shaft 31 rotates, the arm 170 rotates with it and when the contact bar 171 engages the contact track 168 and the rheostat coil 167, current is directed through the coil of the electro-magnet 162. As the contact arm 171 travels towards its initial position more current is directed to the coil of the electro-magnet 162 thereby more highly energizing it and causing more pull on the core 161 which through the medium of the arm 160 swings the arm 159 about its pivot thereby moving the contact bar 158 towards the high side of the rheostat 155 thereby increasing the flow of current to the heating element 25.

Adjustably mounted on the track 116 I provide a block of insulating material 173 on which I provide contacts 174 and 175 which are adapted to be bridged by a contact bar 176 on the block 114. The contact 174 is connected by a wire 177 to the wire 101 and the contact 175 is connected by a wire 178 to the wire 120. Interposed in series in the wire 178 I provide a light globe 179 which is preferably red in color, a bell or buzzer 180 and a rheostat unit 181.

The block 173 is adapted to be positioned on the track 116 in such a position that the contacts 174 and 175 will be bridged by the contact bar 176 when the heat in the still 10 has reached a dangerous point. When the contact bar 176 bridges the contacts 174 and 175 current from the wire 101 to the electro-magnetic coil 106 is shunted through the wire 177, contacts 174 and 175, contact bar 176, wire 178, light 179, buzzer 180 and the resistance 181 back to the negative wire 120 thereby breaking the circuit to the electro-magnet coil 106. Whereupon the spring 109 moves the contact bar 104 out of engagement with the contacts 99 and 100 thereby breaking the electrical circuit to all the electrical devices.

When it is desired to test a liquid as for example, gasoline, with my improved system the operator puts a predetermined amount of the liquid in the still 10 and places a chart 28 on the drum 27 and makes certain that the stylus 36 is over the zero line on the chart. As no heat has as yet been applied to the still 10 the arm 56 of the device 55 is at its initial starting point so the operator moves the block 114 toward the arm 56 so that the contact bar 117 bridges the contacts 113 and 115. The operator then closes the switches 96 and 102 whereupon the electro-magnetic coil 106 is energized and attracts its core 105 thereto which in turn moves the contact bar 104 into engagement with the contacts 99 and 100 thereby establishing an electric circuit to the glow tube 20, the transformer 135 and the heating element 25.

As the heat in the still 10 rises, the arm 56 moves in an arc away from its initial starting point and moves the block 114 with it. If the heat in the still 10 decreases and the arm 56 moves toward its initial position, the contact bar 117 is moved out of engagement with the contacts 113 and 115 thereby breaking the circuit to the electro-magnet coil 106 whereupon the circuit from the contact 100 to the contact 99 is broken thereby breaking the circuit to the glow tube 20, the heating element 25 and the transformer 135. At the same time a circuit is completed to the light 123 and the buzzer 125 which warns the operator that distillation has ceased.

As the liquid in the still 10 is heated the vapors arising therefrom pass through the outlet 12 into the condensing tube 13 wherein they are condensed into a liquid which flows into the collector tube 15. As the rising meniscus in the collector tube 15 passes one of the apertures 21 in the housing 18 it momentarily lessens the amount of light passing from the glow tube 20 to the photoelectric cell 19 whereupon the flow of current to the electro-magnetic coil 75 is lessened and the spring 74 moves the arm 67 upward. As the arm 67 is so moved the finger 68 thereon moves out of one of the notches 61 in the disc 60 and the contact bar 69 bridges the contacts 70 and 71 thereby completing a circuit to the motor 35 whereupon through the medium of the gears 33 and 34 the motor rotates the shaft 31, the drum 27 and the disc 60, thus establishing another circuit through the contacts 63 and 64 and one of the contact bars 62 to the motor as previously described.

After the meniscus has passed the adjacent aperture 21 in the housing 18 the normal amount of light again passes from the glow tube 20 to the photo electric cell 19 whereupon the flow of current to the electro-magnetic coil 75 is sufficient to attract the core 76 thereto thus moving the arm 67 downward. As the arm 67 is moved downward the finger portion 68 thereof engages the outer periphery of the disc 60 and rides thereon until the next notch 61 aligns with the finger whereupon the finger enters the notch and prevents further rotation of the disc. At the same time the contact bar 62 which has bridged the contacts 63 and 64 moves out of engagement with the contacts thereby breaking the circuit to the motor 35.

When the arm 67 moves upward the stylus 36 is moved downward and through the inked tape 43 produces a mark upon the chart 28 as indicated at 183 in Fig. 6. This mark 183 on the chart shows the amount of distilled fluid in the collector tube 15 and the temperature of the vapor in the still at the time that amount had collected.

From the foregoing description it will be apparent that I have provided a novel apparatus for testing fluids which can be economically manufactured and which is highly efficient in use.

Having thus described my invention, I claim:

1. In a device of the class described, a receptacle to receive liquid to be tested, electrically operated means to record the temperature of the liquid passing to the receptacle, a light responsive element associated with the receptacle and means including the light responsive element to record the volume of condensed vapor.

2. In a device of the class described, a receptacle for liquid to be tested, means to vaporize and condense the liquid as it passes to the receptacle, a thermo-responsive means for recording the temperature of the vaporized liquid, a light responsive element associated with the receptacle, means actuated by condensed fluid to actuate the light responsive element, means actuated by the light responsive element to record the various volumes of condensed vapor, said volume recording means coacting with said temperature recording means to provide a graph showing the volume of fluid vaporized at each successive temperature.

3. In a device of the class described, a receptacle for liquid to be tested, said receptacle including a transparent wall portion, a photo-electric cell disposed adjacent to said transparent wall portion, a glow tube disposed adjacent to said transparent wall portion and means operated by said photo-electric cell and said glow tube to record the volume of liquid in the receptacle.

4. In a device of the class described, a receptacle for liquid to be tested, said receptacle including a transparent portion, a glow tube associated with said transparent portion, a housing associated with said transparent portion, a photo-electric cell in said housing, said housing having apertures therein disposed to direct light passing from said glow tube through said transparent portion and onto said photo-electric cell, a recording device including a chart and a marking stylus and electrical means actuated by said photo-electric cell to move said chart relative to said stylus.

5. In a device of the class described, a receptacle for condensed vaporized liquid to be tested, said receptacle being elongated whereby the column of liquid therein forms a meniscus, said receptacle including a transparent portion, a photo-electric cell and a glow tube spaced apart and between which the meniscus advances and means operated by said photo-electric cell to record the advance of the meniscus in the receptacle.

6. In a device of the class described, a receptacle for condensed vaporized liquid to be tested, said receptacle being elongated whereby the column of liquid therein forms a meniscus, said receptacle including a transparent portion, a photo-electric cell and a glow tube spaced apart and between which the meniscus advances, means operated by said photo-electric cell to record the advance of the meniscus in the receptacle and means to record the temperature of the vapor at intervals as the meniscus advances.

GEORGE W. JOSTEN.